US011083982B2

(12) United States Patent
Studer et al.

(10) Patent No.: US 11,083,982 B2
(45) Date of Patent: Aug. 10, 2021

(54) COALESCING FROTHY FLUIDS

(71) Applicant: Hewlett-Packard Development Company, L.P., Houston, TX (US)

(72) Inventors: Anthony D Studer, Albany, OR (US); Robert S Wickwire, Corvallis, OR (US); David J Benson, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 311 days.

(21) Appl. No.: 16/064,236

(22) PCT Filed: Apr. 11, 2016

(86) PCT No.: PCT/US2016/026990
§ 371 (c)(1),
(2) Date: Jun. 20, 2018

(87) PCT Pub. No.: WO2017/180094
PCT Pub. Date: Oct. 19, 2017

(65) Prior Publication Data
US 2019/0022559 A1   Jan. 24, 2019

(51) Int. Cl.
*B01D 19/00* (2006.01)
*B41J 2/19* (2006.01)
*B41J 2/175* (2006.01)
*B01D 19/02* (2006.01)

(52) U.S. Cl.
CPC ......... *B01D 19/0031* (2013.01); *B01D 19/02* (2013.01); *B41J 2/175* (2013.01); *B41J 2/17566* (2013.01); *B41J 2/19* (2013.01)

(58) Field of Classification Search
CPC ...... B01D 19/0031; B01D 19/02; B41J 2/175; B41J 2/19; B41J 2/17566
See application file for complete search history.

(56) References Cited

U.S. PATENT DOCUMENTS

| 4,153,902 | A |   | 5/1979  | Kanayama |
| 4,476,472 | A |   | 10/1984 | Aiba et al. |
| 5,185,614 | A | * | 2/1993  | Courian ................. B41J 2/1652 347/24 |
| 6,139,138 | A |   | 10/2000 | Powers et al. |
| 6,715,855 | B2 |  | 4/2004  | Oda et al. |
| 7,118,206 | B1 |  | 10/2006 | Stockwell et al. |

(Continued)

FOREIGN PATENT DOCUMENTS

| CN | 2928196 Y   | 8/2007 |
| CN | 201375869 Y | 1/2010 |

(Continued)

*Primary Examiner* — Robert Clemente
(74) *Attorney, Agent, or Firm* — Fabian VanCott (57) ABSTRACT

In one example in accordance with the present disclosure a device for coalescing a frothy fluid is described. The device includes a housing and alignment devices. The alignment devices receive a number of coalescing filters, space the number of coalescing filters to form a gap between adjacent coalescing filters, and seal the number of coalescing filters against the housing to enclose the gap. The device also includes an inlet port to drive incoming frothy fluid through the gap, an outlet port to drain coalesced fluid, and an air vent to allow air to escape the gap.

20 Claims, 7 Drawing Sheets

(56) References Cited

U.S. PATENT DOCUMENTS

| | | |
|---|---|---|
| 8,020,982 B2 | 9/2011 | Mun et al. |
| 9,016,841 B2 * | 4/2015 | Johnson ............... B41J 2/14233 347/85 |
| 9,132,657 B2 | 9/2015 | Takahashi et al. |
| 2002/0171720 A1 | 11/2002 | Hanaoka et al. |
| 2004/0080592 A1 * | 4/2004 | Kneezel ............... B41J 2/17563 347/93 |
| 2004/0165040 A1 * | 8/2004 | Olsen ................ B01D 67/0088 347/85 |
| 2006/0165935 A1 | 7/2006 | Studer et al. |
| 2007/0006735 A1 * | 1/2007 | Olsen ................... B41J 2/17563 96/188 |
| 2007/0109365 A1 | 5/2007 | Okuda |

FOREIGN PATENT DOCUMENTS

| | | | |
|---|---|---|---|
| CN | 202223954 U | 5/2012 | |
| CN | 103657219 A | 3/2014 | |
| JP | 2000-062210 A | 2/2000 | |
| JP | 2000062210 A * | 2/2000 | ............. B41J 2/175 |
| JP | 2013-224018 A | 10/2013 | |
| JP | 5398974 | 1/2014 | |

\* cited by examiner

COALESCING FROTHY FLUIDS

BACKGROUND

Froth is a common occurrence in many fluids. Froth is a mass of bubbles in a fluid, or on the surface of the fluid. Froth can form as air is incorporated into the fluid. For example, in ink printing systems, as air is introduced into an ink reservoir to maintain pressure, froth may form in the corpus of the ink or on a surface of the ink. Froth is also found in other fluids, for example detergents or liquid soaps. Such froth may inhibit the operations of a system that processes fluids.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As described above, froth may be found in many fluids. For example, in printing systems, a desired backpressure may be desirable in an ink printhead. To maintain this pressure, air is introduced into the printhead. The mixture of the ink and air generates froth within the printhead. While specific reference is made to froth in an ink printhead, such froth can exist in any fluid-processing system. For example, some devices such as industrial cleaning devices use liquid detergent to clean components of the system. These devices similarly contain a froth layer due to the incorporation of air, surfactants, or other components.

Such froth can impact the functionality of the system. For example, in an ink system, froth may reduce the accuracy of certain sensors such as an ink level gauge or a sensor that indicates that the system is out of ink. The accuracy of these sensors and gauges impacts customer satisfaction, system performance, and system reliability. More specifically, the froth present in an ink supply could prematurely trigger an out of ink sensor. Such a premature triggering of the sensor could lead to the replacement of an ink supply prior to its exhaustion, which is an inefficient use of ink as well as a loss of revenue for a producer, and may create an impression on the customer that an ink supply drains sooner than it actually does. In some cases, such a premature triggering of an ink sensor could also lead to failure of the printing system.

Some systems have implemented a batch froth dissipation system wherein froth accumulates and dissipates over time and is gravity fed back into the system. However, this system relies on time to dissipate the froth, and accordingly a lag is introduced between froth accumulation and coalescence. Such a lag, in addition to being inefficient, also leads to erroneous fluid level readings.

Accordingly, the present specification describes devices and methods for coalescing a frothy fluid into coalesced fluid and air. Specifically, the present specification describes a system that continuously, and not in a batched or periodic fashion, coalesces a frothy fluid in real-time. In so doing, the function of the corresponding system in general is improved, specifically the accuracy of system sensors is improved, which leads to improved system performance, increased customer satisfaction, and improved fluid efficiency. Still further, the present devices and methods are oriented to promote the dissipation of froth, rather than just allowing time to eventually break down the froth bubbles.

In addition to those situations mentioned above, froth may impact the fluid-processing systems in other ways. Accordingly, a real-time, quick, and continuous method for reducing froth in a fluid would enhance the operation of such fluid-processing systems in any number of ways by removing froth more quickly and continuously without having to rely on the periodic opening and closing of valves and the use of electrical or other mechanical sensors that increase the complexity of a system.

Accordingly, the present specification describes a device for coalescing a frothy fluid. The device includes a housing and alignment devices. The alignment devices receive a number of coalescing filters, space the number of coalescing filters to form a gap between adjacent coalescing filters, and seal the number of coalescing filters against the housing to enclose the gap. The device also includes an inlet port to drive incoming frothy fluid through the gap, an outlet port to drain coalesced fluid, and a first air vent to allow air to escape the gap.

The present specification also describes a system for coalescing a frothy fluid. The system includes a filter chamber. The filter chamber includes a housing and alignment devices. The alignment devices are to receive a number of coalescing filters, space the number of coalescing filters to form a gap between adjacent coalescing filters, and seal the number of coalescing filters against the housing to enclose the gap. The device also includes an inlet port to drive incoming frothy fluid through the gap. An outlet port drains coalesced fluid. A first air vent allows air to escape the gap. The system also includes multiple coalescing filters to mate with the alignment devices. The multiple coalescing filters are separated from one another by the gap.

The present specification also describes a system for coalescing a frothy fluid. The system includes a rectangular filter chamber. The rectangular filter chamber includes a housing and alignment devices. The alignment devices are to receive at least two coalescing filters, space the at least two coalescing filters to form a gap between adjacent coalescing filters, and seal the at least two coalescing filters against the housing to enclose the gap. The device also includes an inlet port to drive incoming frothy fluid through the gap perpendicular to pores in the at least two coalescing filters, an outlet port to drain coalesced fluid, and a first air vent to allow air to escape the gap. The rectangular filter chamber also includes a lid having a second air vent to allow air to escape the rectangular filter chamber. A removable front cover of the rectangular filter chamber facilitates insertion of multiple coalescing filters. The system also includes multiple coalescing filters. A coalescing filter mates with an alignment device, dissipates bubbles in the frothy fluid, and allows passage of coalesced fluid through pores in the coalescing filter. The multiple coalescing filters are separated from one another by the gap.

Using such a device for coalescing a frothy fluid 1) allows for real-time, and not delayed, batched, or periodic, dispersal of froth from a fluid; 2) is passive in that it doesn't rely on sensors, or other moving components to dissipate the froth; 3) actively promotes the dissipation of froth, rather than allowing the froth to dissipate as merely a function of time; 4) improves froth-dissipation efficiency thereby enhancing the operation of a system that processes a fluid prone to froth accumulation; 5) improves the accuracy of certain system sensors, and 6) accommodates faster operations of a fluid-processing system by providing a continuous real-time defrothing of a frothy fluid. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Figure 1A:
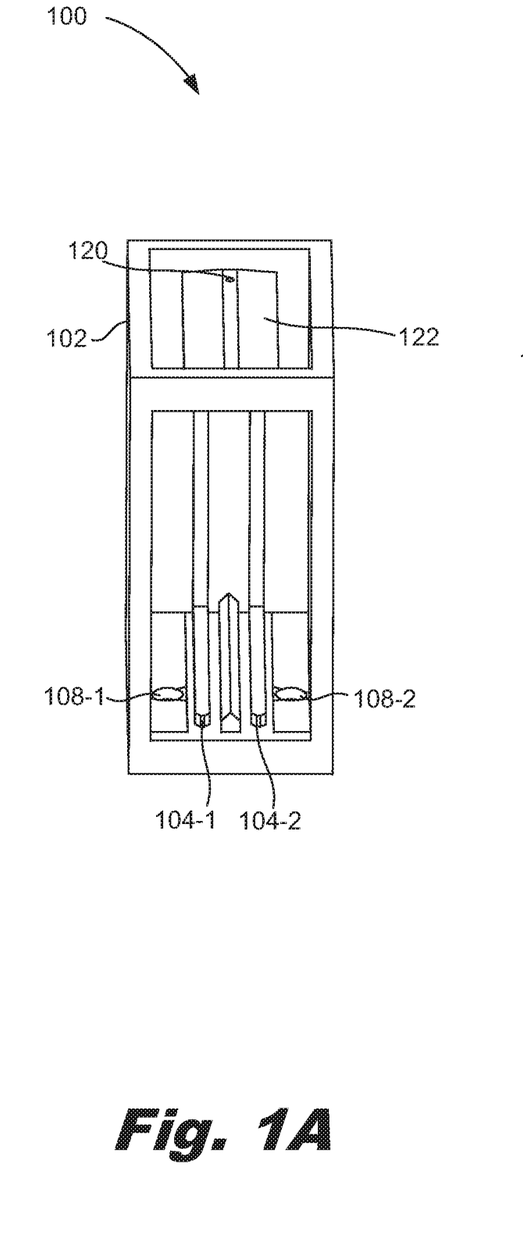
FIGS. 1A and 1B are views of a device for coalescing a frothy fluid, according to one example of the principles described herein.
Figure 1B:
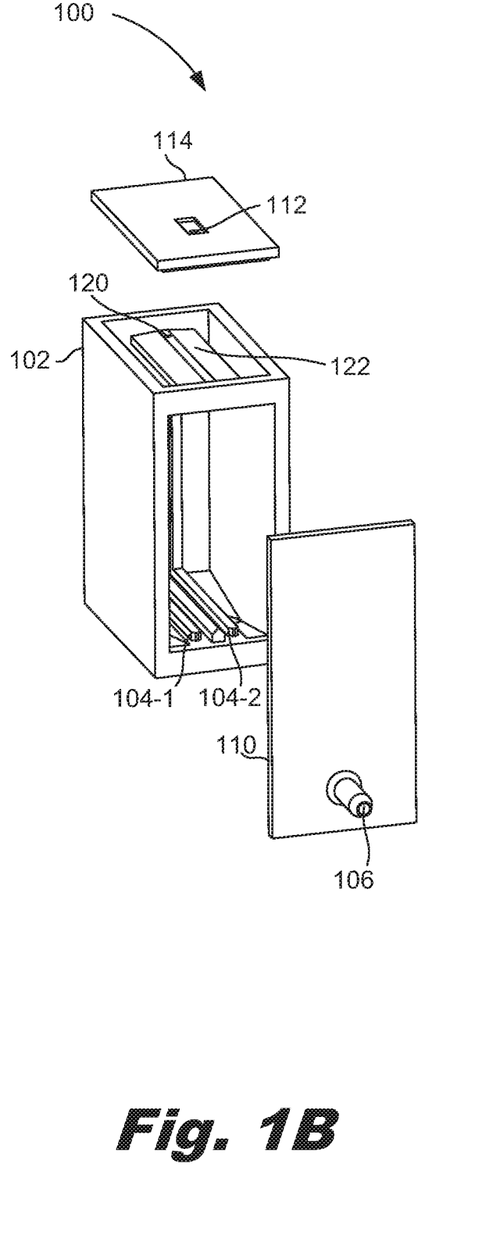

Turning now to the figures, FIGS. 1A and 1B are views of a device (100) for coalescing a frothy fluid, according to one example of the principles described herein. Specifically, FIG. 1A is a front view of the device (100) and FIG. 1B is an exploded isometric view of the device with a lid (114) and a front cover (110).

The device (100), which may act as a filter chamber, includes a housing (102). The housing (102) is a receptacle of incoming frothy fluid and houses the filters which are used to dissipate the bubbles that make up the froth. While FIGS. 1A and 1B depict a rectangular filter chamber, i.e., a rectangular housing (102), the housing (102) may be any shape or size. A rectangular housing (102) is easily manufactured and provides a shape that can be easily placed inside a system.

The device (100) also includes a number of alignment devices (104-1, 104-2). As used in the present specification, the indicator "-*" refers to a specific instance of an element. For example, a first alignment device is referenced as (104-1). The absence of the indicator "-*" refers to the element in general. For example, a generic alignment device is referenced as (104).

The alignment devices (104) are to receive coalescing filters, which coalescing filters are used to separate coalesced fluid and air as the result of the bursting of froth bubbles in the frothy fluid. The alignment devices (104) run so as to surround multiple sides of a corresponding coalescing filter. The alignment devices (104) create a seal between the inserted filters and the housing (102). A corresponding device on the front cover (110) completes the seal of the coalescing filters. The alignment devices (104) are spaced to facilitate the dissipation of froth bubbles. Specifically, the alignment devices (104) are spaced to form a gap between adjacent filters. It is within this gap between filters that the frothy fluid travels through the device (100). For example, as frothy fluid enters the inlet port (106), the fluid is driven between the filters and upwards. In some examples, the alignment devices (104) are ridges that run around the interior of the housing (102) where a coalescing filter is to be inserted. Recesses in the coalescing filters mate with these ridges in a tongue-and-groove fashion to position the coalescing filters as well as to seal the coalescing filters, on all sides, against the housing (102).

The narrow gap created by the alignment devices (104) actively promotes the dissipation of froth bubbles, rather than having the defrothing be solely a function of time. For example, in accumulation systems, frothy fluid is allowed to accumulate, but dissipation occurs naturally, potentially over long periods of time. By comparison, in the present device (100) dissipation of the froth is encouraged. For example, the gap is sized such that individual bubbles stack on top of one another in the gap between the coalescing filters. Stacking the bubbles single-file as such, weakens the bubbles, dries them out, and therefore increases their rate of dissipation. Furthermore, the gap between the filters may be such that pressure is exerted on the bubble walls, further encouraging collapse of the bubbles. Moreover, the path of the bubbles through the gap, and upwards through the gap, causes the bubbles to dry up weaken, and burst as a function of height. As a result, the present device (100), and specifically the driving of the frothy fluid through a narrow gap, increases the rate of dissipation of the bubbles of the frothy fluid.

A coalesced fluid and air are generated as a froth bubble bursts. The coalesced fluid flows through the coalescing filters. Outlet ports (108-1, 108-2) of the device (100) catch the coalesced fluid as it runs out of the coalescing filters. Accordingly, the outlet ports (108) may be disposed on a lowest point of drainage on the housing (102), for example on a bottom surface of the housing (102). This drained coalesced fluid can then be returned to the system of which the device (100) is a part, to be used for its intended purpose. For example, ink may be returned for use in printing on a print media.

To manage the air resulting from the dissipation of froth bubbles, the device (100) includes a first air vent (120) to allow air to escape as the froth bubbles dissipate. In some examples, if the device (100) includes a lid (114), a second air vent (112) may be included. The use of the lid (114) and the second air vent (112) allow for the tuning of the internal pressure of the device (100), which affects the flow of the printing fluid out of the outlet ports (108). Examples of the lid (114), and specifically the air vent (112), are provided below in connection with FIGS. 7A-7C. As will be described below, based on the characteristics of the system, the device (100) may be operated at atmospheric pressure, or a desired pressure greater than, or less than, atmospheric may be maintained in the device (100).

Returning to the first air vent (120), in some examples, the housing (102) includes an outlet roof (122). During use, as the froth bubbles rise towards the first air vent (120), a small amount of froth bubbles may still exist. As these froth bubbles pass through the first air vent (120) in the outlet roof (122), they may burst resulting in coalesced fluid and air. Accordingly, the outlet roof (122) may be sloped such that any resultant coalesced fluid drains off of the outlet roof (122) to join with the rest of the coalesced fluid in draining to the outlet ports (FIG. 1, 108). The outlet roof (122) may also include alignment devices (104) to seal against a top surface of any inserted coalescing filters.

The device (100) also includes an inlet port (106) to drive incoming frothy fluid through the aforementioned gap. As indicated in FIG. 1B, in some examples, the inlet port (106) is disposed on a front cover (110) of the housing (102), which front cover (110) may be removable to allow insertion of different coalescing filters.

In one example, the fluid running through the device (100) is ink. For example, as ink is used during printing, it is replaced with air that is bubbled in. The bubbling in of air generates a froth in, or on the surface of, the ink. This frothy ink is received at the device (100) via the inlet port (106). While specific reference is made to frothy ink, the device (100) may be used to coalesce any frothy fluid such as detergents, or water with any number of components that generate froth within the water such as surfactants.

The device (100) as described herein allows for the continuous and automatic removal of gas from a flowing stream of mixed fluid and gas of varying concentration ratios. It is continuous in that it does not rely on the periodic dispersal of the gas or froth in a liquid, but rather froth bubbles are continuously dissipated as the frothy fluid follows a path, such as the path defined by the gap between filters. It is automatic in that there are no electrical stimuli that activate a dispersal mechanism of the device (100). For example, a batch system accumulates gas/air in a storage volume and then periodically removes the accumulated gas/air by the use of active valves, pumps or vacuum sources that are controlled by some control apparatus. However, the present device (100) doesn't use such valves, pumps, or control apparatus to dissipate gas from a liquid. The present system operates based on the energy created when fluid flows into the inlet port (106).

Still further, the real-time dissipation, i.e., continuous, of froth bubbles, allows the device (100) to keep up with the demands of systems incorporating the device (100), which systems may necessitate increased fluid flow rates, and increased froth removal quantities. For example, in a printing environment, faster print speeds and higher quality inks may generate greater amounts of froth. The continuous, real-time defrothing and a device (100) orientation that promotes, or encourages froth dissipation, allows for the device (100) to meet the demands of increased fluidic system operation. Even further, the device (100) as described herein is an efficient, low-cost, space-efficient froth coalescing device, which delivers a desired volume of coalesced fluid into a fluid reservoir.

Figure 2A:
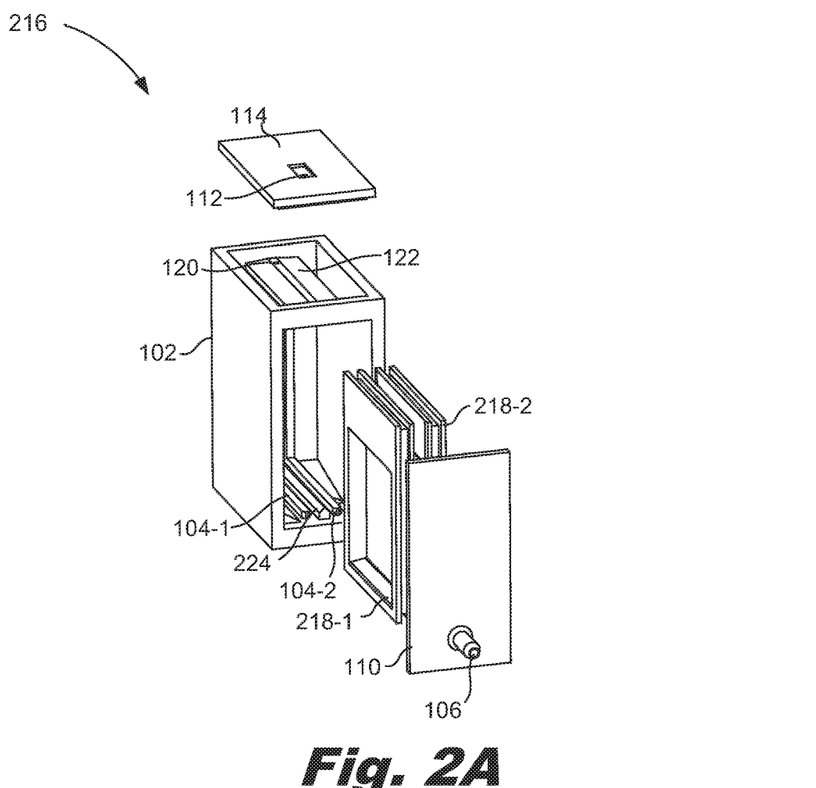
FIGS. 2A and 2B are views of a system for coalescing a frothy fluid, according to one example of the principles described herein.
Figure 2B:
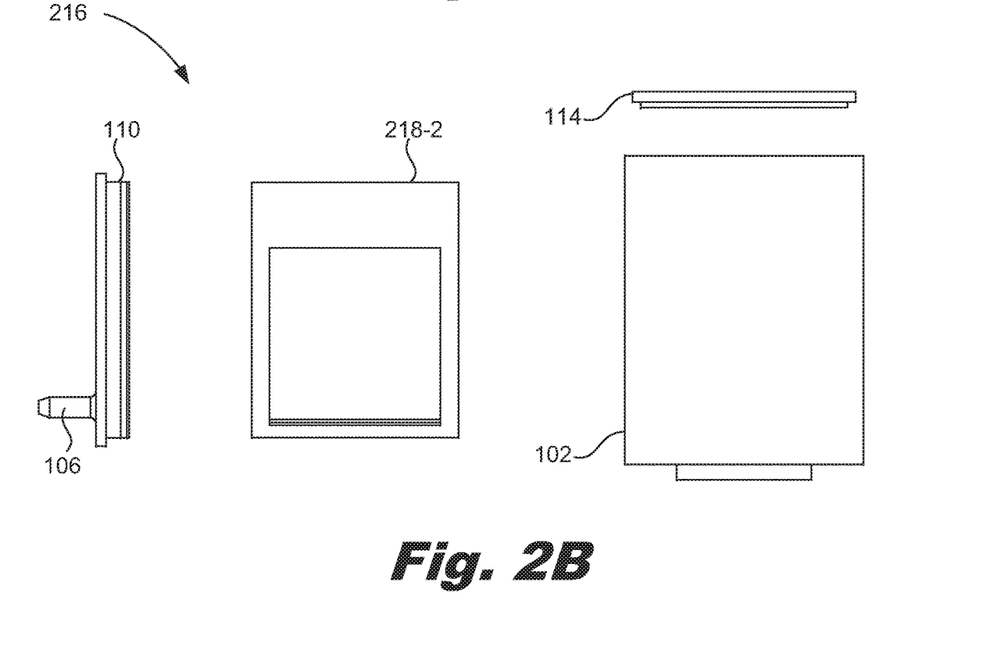

FIGS. 2A and 2B are views of a system (216) for coalescing a frothy fluid, according to one example of the principles described herein. Specifically, FIG. 2A is an exploded isometric view of the system (216) and FIG. 2B is an exploded side view of the system (216). The system (216) includes a filter chamber that includes the housing (102), alignment devices (104-1, 104-2), inlet port (106), outlet ports (FIG. 1, 108-1, 108-2) and first air vent (120) as described above. As depicted in the Figures, in some examples, the inlet port (106) is disposed at the bottom of the front cover (110) aligned with a bottom of the coalescing filters (218) that are disposed within the housing (102). Doing so increases the portion of the surface area of the filters (218) that is used to defroth the frothy fluid. For example, if the inlet port (106) were aligned with a middle of the filters (218), or at the top, then a reduced portion of the filter (218) mesh, the portion above the inlet port (106), is used real-time.

The system (216) also includes multiple coalescing filters (218-1, 218-2). The coalescing filters (218-1, 218-2) include components that correspond to, and mate with, the alignment devices (104-1, 104-2) of the housing (102) and the front cover (110). For example, the components on the coalescing filters (218-1, 218-2) may be recesses that mate with the alignment ridges in a tongue and groove fashion. This mating of the recess on the coalescing filters (218) and the alignment devices (104) on the housing (102) and front cover (110) generate a seal of the coalescing filter (218) inside the chamber.

The coalescing filters (218) are used to dissipate bubbles in the froth fluid. When disposed within the housing (102), the coalescing filters (218) are separated from one another via a gap formed by the alignment devices (104). In other words, there is a gap between the filters (218). It is within this gap that the frothy fluid travels through the device (100). As described above, the filters (218) and the placement of the filters (218) relative to one another, aid in, and promote the dissipation of froth bubbles as well as draining the coalesced fluid.

The coalescing filters (218) may be made out of any material. For example, the coalescing filters (218) may be formed of metal or a polymer material. The coalescing filters (218) include pores for allowing coalesced fluid to pass through. The sizing, density, and shape of these pores is selected based on the type of fluid passing through. For example, one coalescing filter (218) may be desirable for one application where larger pore sizes, and a lighter density of the pores is desired. In another example, another coalescing filter (218) that has smaller pores that are more densely packed, may be desirable. Moreover, the size of the coalescing filter (218) which may be defined by a height of the coalescing filter (218) may be selected based on the application. For example, if a greater flow of fluid is anticipated, the coalescing filter (218) may be taller to facilitate the increased flow. Accordingly, coalescing filter (218) characteristics such as size, pore size, and pore density can be selected to meet differing device (100) operating characteristics such as a more aggressive recharge, accommodating different froth characteristics, etc.

Still to this point, for a given operational pressure and a given operating fluid, the coalescing filter (218) screen mesh size may be selected such that it has a higher bubble pressure than a pressure to move the froth between the coalescing filter (218) mesh. If not done, then instead of coalescing the bubbles, the coalescing filter (218) would merely create bubbles. Likewise based on the fluid properties, the area of the coalescing filter (218) mesh may be sized to support the flow of fluid to be used throughout the system in which the device (100) is installed. If the coalescing filter (218) area is too small, then it will not work real-time, which would result in a decrease in efficiency.

The coalescing filters (218) include a screen mesh filter material that is disposed within a frame. The mesh filter material can be joined to the frame a number of ways including gluing the filter material to the frame, using mechanical fasteners, or heat staking the filter material to the frame.

The coalescing filters (218) may be modular. For example, via the removable front cover (110) coalescing filters (218) may be removed and replaced. Doing so allows for different coalescing filters (218) to be inserted to accommodate different operating conditions, without replacing the entire device (100). In other words, the modular coalescing filters (218) allow for various filtering system characteristics to be changed without changing out the entire device (100). Examples of such filtering system characteristics include filter area, filter pore size, filter material, and a gap between an adjacent filter. The gap between filters may be adjusted by placing the filter material in different locations perpendicular to the alignment ridges (104). In other words, the multiple coalescing filters (218) that are used in a particular system (216) are selected from a set of coalescing filters. The coalescing filters (218) in the set may differ from one another in regards to these characteristics. The multiple coalescing filters (218) used during a particular time may have the same characteristics as one another, or may differ in regards to at least one of these characteristics.

In one example, the housing (102) includes a ridge (224) disposed in the gap along a bottom surface of the housing (102) to direct coalesced fluid through the coalescing filters (218). This ridge (224), reduces the dead volume at the bottom of the housing (102) between the adjacent coalescing filters (218), where fluid may reside and go unused.

Figure 3:
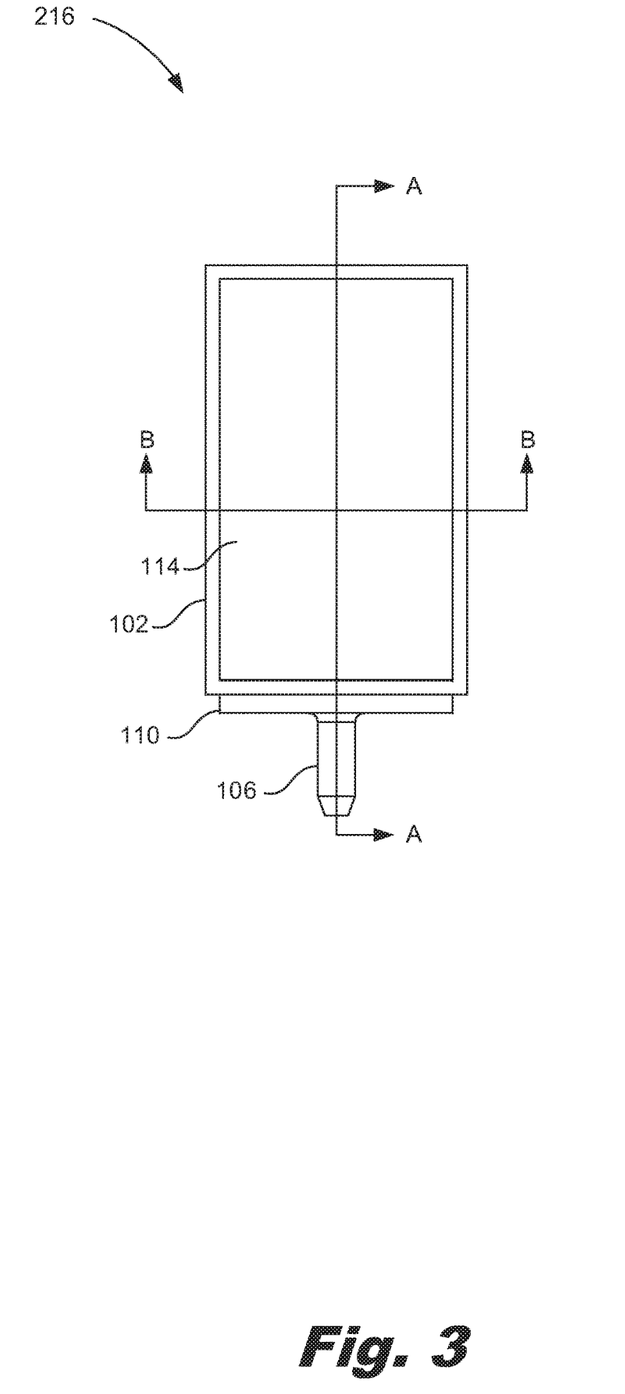
FIG. 3 is a top view of a system for coalescing a frothy fluid, according to one example of the principles described herein.

FIG. 3 is a top view of a system (216) for coalescing a frothy fluid, according to one example of the principles described herein. Visible in FIG. 3 are the inlet port (106), the front cover (110), the housing (102), and the lid (114).

Figure 4:
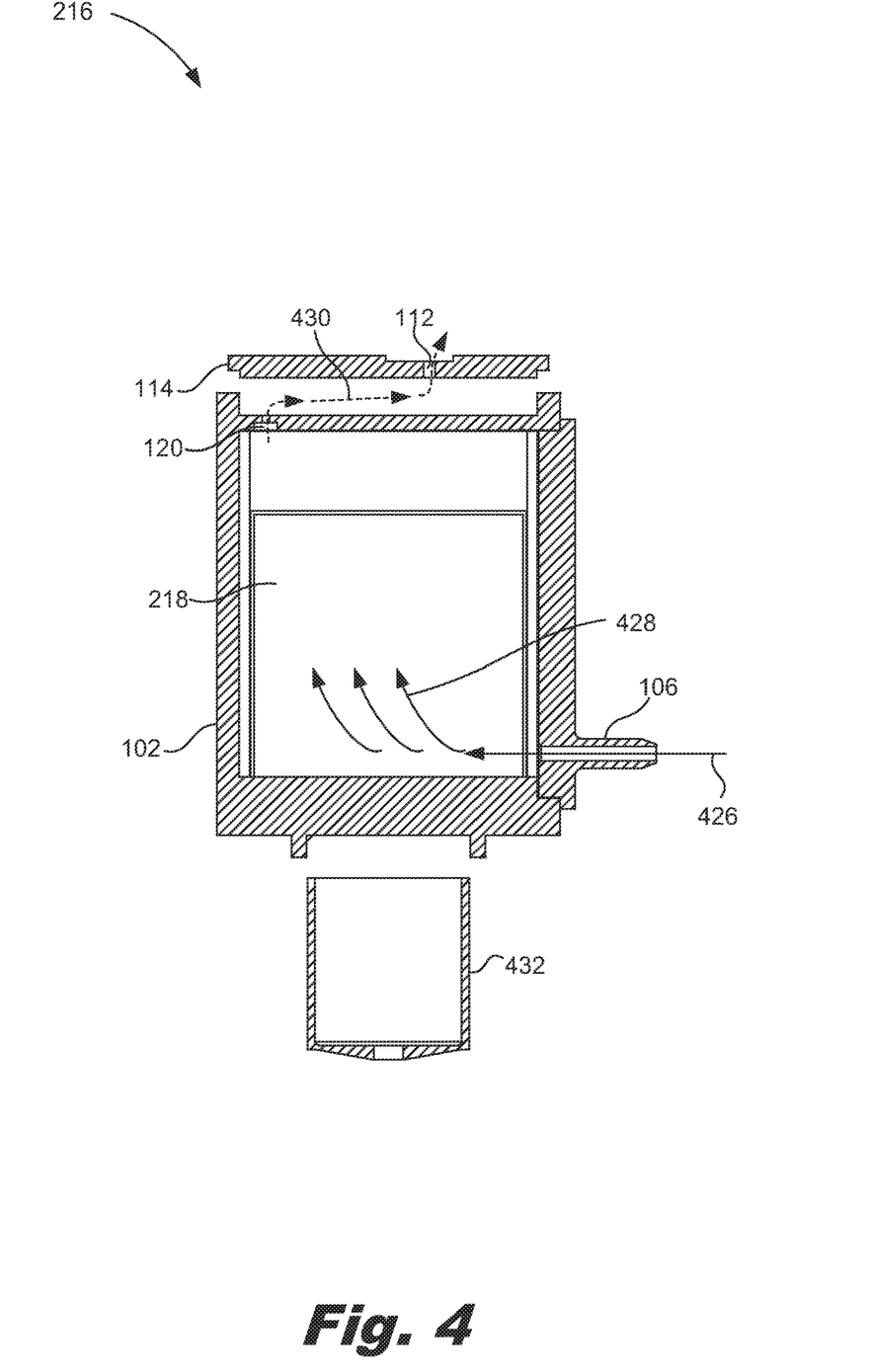
FIG. 4 is an exploded side cross-sectional view of a system for coalescing a frothy fluid, according to one example of the principles described herein.

FIG. 4 is an exploded side cross-sectional view of the system (216) for coalescing a frothy fluid, according to one example of the principles described herein. More specifically, FIG. 4 is a cross-sectional view taken along the line A of FIG. 3. FIG. 4, among other things, depicts the flow of incoming frothy fluid as well as the flow of air resultant from the dissipation of froth bubbles. As described above, frothy fluid enters the system (216) via the inlet port (106), as indicated by the arrow (426). As more frothy fluid is introduced into the system (216), the existing frothy fluid is pushed upwards as indicated by the arrows (428). Due to the dimensions of the gap, as well as the surface properties of the coalescing filters (218), these froth bubbles burst. As will be described in connection with FIG. 5, the coalesced fluid flows down through the coalescing filters (218) and out the outlet ports (FIG. 1, 108). By comparison, the air resultant from the dissipation of froth bubbles escapes out the first air vent (120) in the outlet roof (FIG. 1, 122) and passes out the second air vent (112) in the lid (114) as indicated by the dashed arrows (430). Note that in the device (100) there are two exits for the frothy fluid. The first is through the filters (218), which is used by the coalesced fluid. The second is through the air vent (120), which is used by the gas/air generated as the froth bubbles pop.

FIG. 4 also depicts a collection line (432). This collection line (432) is in fluid communication with the outlet ports (FIG. 1, 108) and recycles, or returns, the coalesced fluid such as ink to the system, such as an ink printing system.

Figure 5:
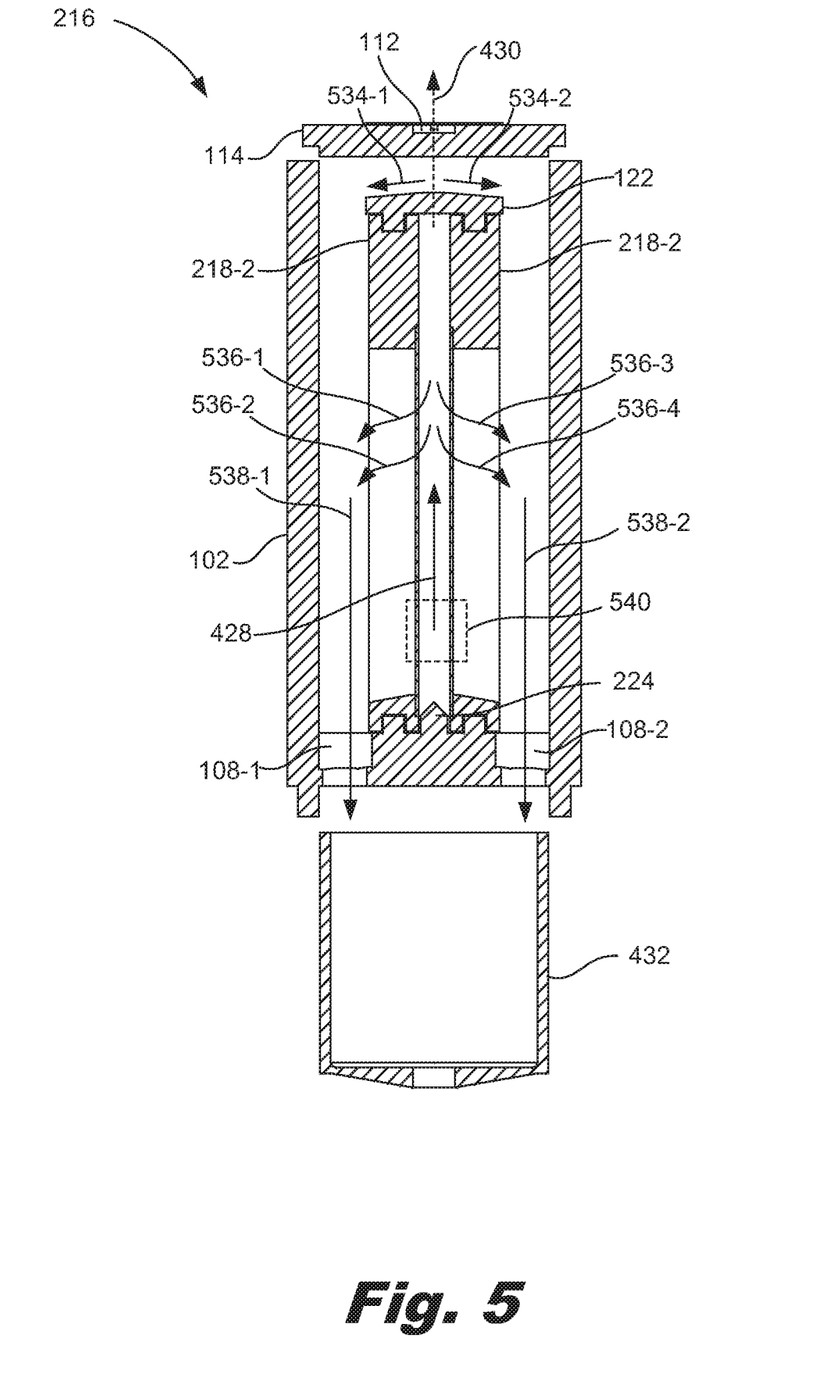
FIG. 5 is an exploded front cross-sectional view of a system for coalescing a frothy fluid, according to one example of the principles described herein.

FIG. 5 is an exploded front cross-sectional view of the system (216) for coalescing a frothy fluid, according to one example of the principles described herein. More specifically, FIG. 5 is a cross-sectional view taken along the line B of FIG. 3. FIG. 5, among other things, depicts the flow of coalesced fluid as well as the flow of air resultant from the dissipation of froth bubbles. As noted in FIG. 4, as the frothy fluid travels into the inlet port (FIG. 1, 106), it is forced upwards as indicated by the arrow (428), perpendicular to pores in the coalescing filters (218). While in the gap, due to the interaction of the coalescing filters (218) with the frothy fluid, the froth bubbles burst. The resultant air vents out a first air vent (FIG. 1, 120) in the outlet roof (220) and ultimately through a second air vent (112) in the lid (114). This flow of air is depicted in FIG. 5 by the dashed arrow (430). As described above, in some examples, a small amount of froth bubbles may escape through the first air vent (FIG. 1, 120). However, upon squeezing though this first air vent (FIG. 1, 120), these bubbles may burst. Accordingly, the outlet roof (122) is sloped such that coalesced fluid resulting from the bursting of these bubbles is directed towards the outlet ports (FIG. 1, 108), which flow is indicated by the arrows (534-1, 534-2).

In other parts of the system (216), as the frothy fluid rises, the froth bubbles are compressed between the coalescing filters (218), which forces the bubbles to combine and burst as they abrade against the surface of the coalescing filters (218). As the froth bubbles burst, they release the fluid between the bubbles as well as the fluid of the bubble shells. The coalesced fluid travels through the coalescing filters (218) as indicted by the arrows (536-1, 536-2, 536-3, 536-4) to be gravity fed, and drained out the outlet ports (108-1, 108-2) as indicated by the arrows (538). As this fluid drains through the coalescing filters (218), the remaining frothy fluid starts to dry out as it continues to travel upward. The frothy fluid continues in this pattern until all bubbles are coalesced and separated into their two parts, i.e., coalesced fluid and air.

By sizing the gap such that pressure is exerted against the walls of the bubbles, the rate of dissipation of froth bubbles is increased as the bubbles are abraded against the rough, porous surface of the filters (218). The gap may also be sized to stack the bubbles single-file, one on top of the other. Similarly, doing so increases the rate of bubble dissipation by reducing the contact surface area of individual bubbles, thus reducing their ability to retain the bubble shape. In a specific example, the gap may be between 0.5 millimeter and four millimeters wide.

Figure 6:
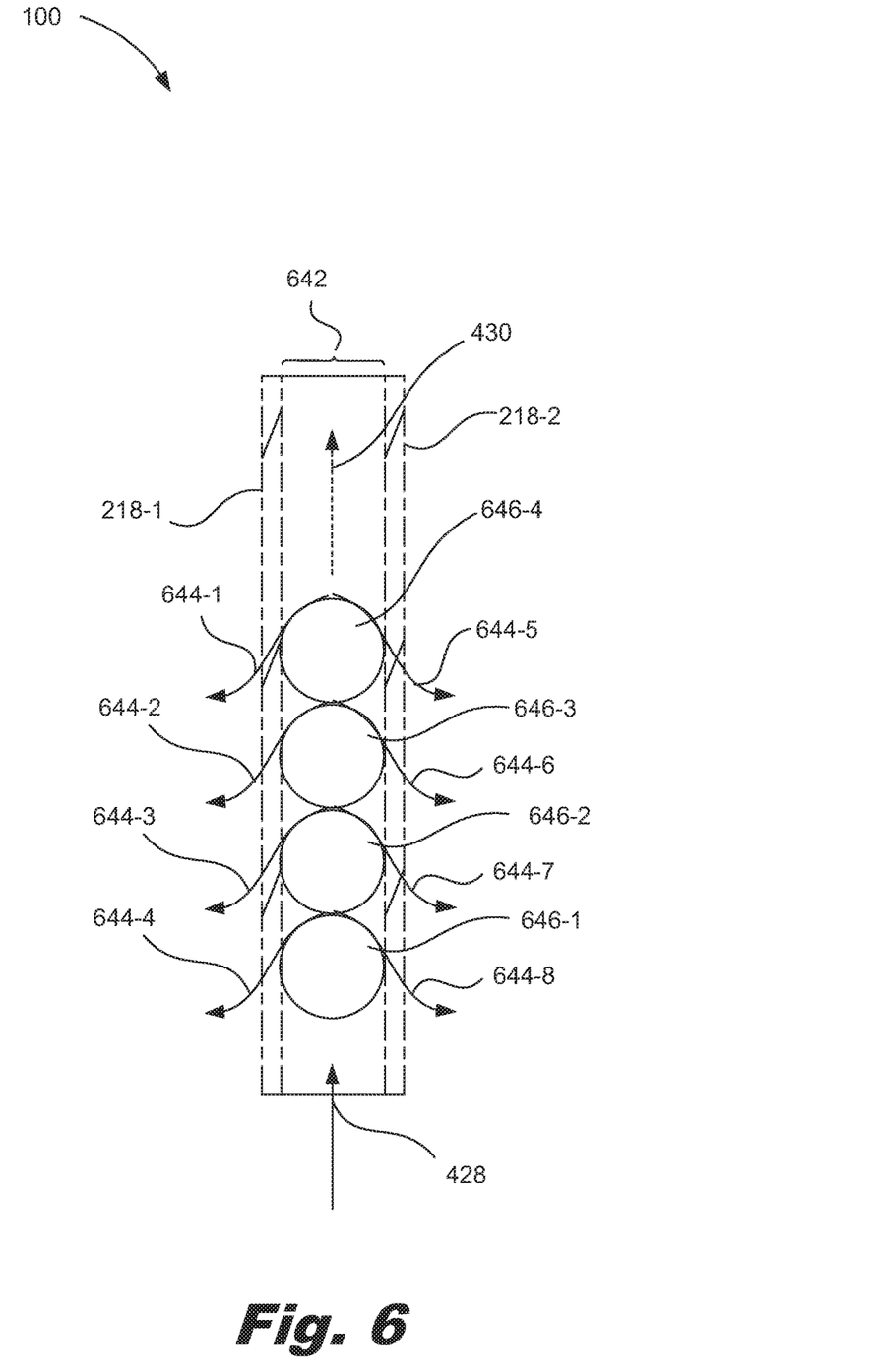
FIG. 6 is a view of the gap between adjacent coalescing filters, according to one example of the principles described herein.

As described above, the modular nature of the coalescing filters (218) allows for different characteristics of the system (216) to be altered. One such example is the spacing between the coalescing filters (218). For example, as depicted in FIG. 5, the screen mesh of the coalescing filters (218) is depicted as being nearest the centerline of the system (216). However, if desired, coalescing filters (218) could be used that space the screen filter material farther apart. In so doing, different fluid properties and operational properties can be accounted for by different coalescing filters (218). FIG. 6 depicts a zoomed in area of the dashed box (540) to further illustrate the motion of the bubbles through the coalescing filters (218).

Note that to aid in guiding the coalesced fluid to the outlet ports (108), the bottoms of the coalescing filter (218) frames are slanted. Still further, the ridge (224) in the gap is also sloped to aid in the directing of coalesced fluid through the coalescing filters (218) and ultimately to the outlet ports (108).

FIG. 6 is a view of the gap (642) between adjacent coalescing filters (218-1, 218-2) of the system (FIG. 2, 216) for coalescing a frothy fluid, according to one example of the principles described herein. Specifically, FIG. 6 depicts a portion depicted in the dashed box (FIG. 5, 540) of FIG. 5. In this example, the frothy fluid enters at a low point of the gap (642) and is driven through the gap (642) as indicated by the arrow (428). As described above, the gap (642) is spaced such that bubbles (646-1, 646-2, 646-3, 646-4) that form the froth are stacked single-file in the gap (642). Forming the gap (642) as described provides a shortened drain for the fluid, thus speeding up the thinning of the bubbles (646). The stacking of the bubbles (646) also increases the effect of gravity when draining the resulting coalesced fluid. The gap (642) may be sized to exert pressure on the bubble (646) walls. Doing so, abrades the bubbles (646) against the rough porous surface of the filters (218), thus causing rupture of the bubble (646) surface. Once the bubbles pop, the resultant coalesced fluid is passed through the filters (218) as indicated by the arrows (644-1, 644-2, 644-3, 644-4, 644-5, 644-6, 644-7, 644-8) and the resultant air is passed upward as indicated by the arrow (430) to be ultimately vented out the air vent (FIG. 1, 112).

Having a single layer of bubbles (646) between the coalescing filters (218) shortens the drain path of each bubble (646) in the froth. In this device (100), the coalesced fluid can drain rapidly through the coalescing filters (218) as indicated by the arrows (644). The path through the gap (642) also increases the rate at which the bubbles (646) pop, as bubbles (646) that are higher in the device (100) are dryer due to the increased height. Accordingly, the size of the device (100) both in width and height, affect how the bubbles (646) will dissipate and may be selected based on the operational characteristics of the system and material properties of the fluid.

Figure 7A:
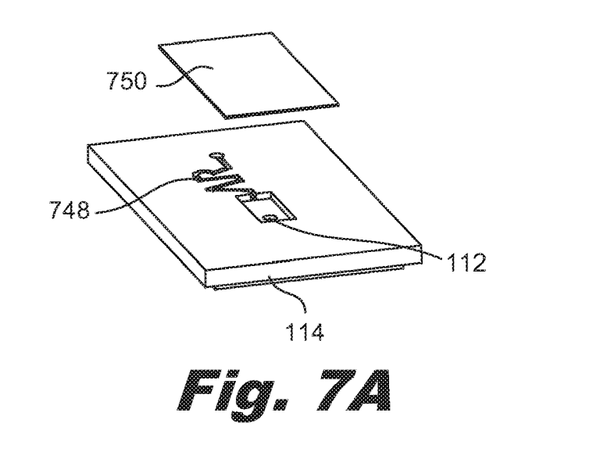
FIGS. 7A-7C are diagrams of a lid of the device for coalescing a frothy fluid, according to one example of the principles described herein.
Figure 7B:
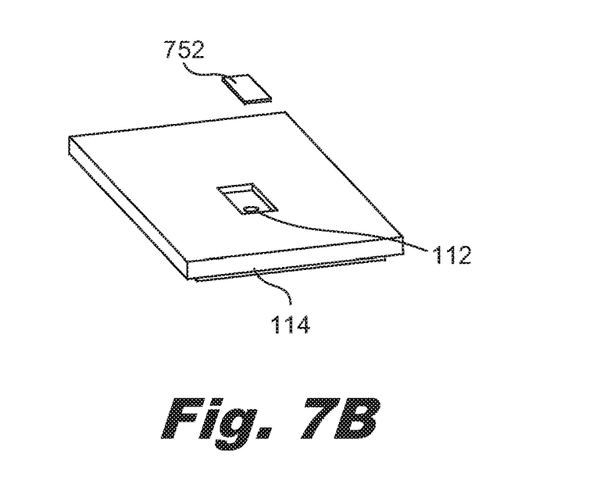
Figure 7C:
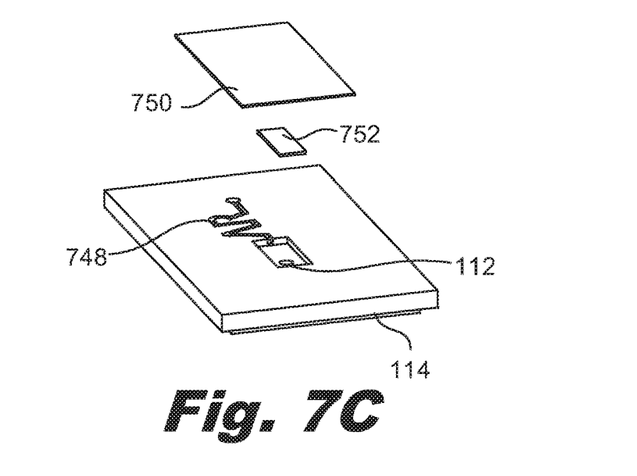

FIGS. 7A-7C are diagrams of a lid (114) of the device (FIG. 1, 100) for coalescing a frothy fluid, according to one example of the principles described herein. As described, the lid (114) may include a second air vent (112) to allow air resultant from the dissipation of froth bubbles to escape. The size of the second air vent (112) may be based on the operational characteristics of the system. For example, if the second air vent (112) is too small, the internal backpressure within the housing (FIG. 1, 102) increases and may impact the operation of the system (FIG. 2, 216).

In some examples, the second air vent (112) exposes the interior of the housing (FIG. 1, 102) to atmospheric pressure. For example, as depicted in FIG. 7A, the air vent (112) may be coupled to a labyrinth (748) to allow the escape of the air. In this example, a small second air vent (112) is coupled to a channel, i.e., labyrinth (748) that has a small cross-sectional area and many turns. A label (750) is then placed over the labyrinth (748). The label (750) may have water vapor transmission prevention properties. That is, it may be a polymer barrier, or a metalized layer barrier such that water doesn't transmit through it quickly. In this example, as air passes through the second air vent (112) and goes through the channel, this highly humidified air mixes with ambient air at the other end of the labyrinth (748) and slows down the water vapor transmission.

In another example, the second air vent (112) can maintain a greater than atmospheric pressure within the housing (FIG. 1, 102). For example, as depicted in FIG. 7B, an oleophobic membrane (752) or plug is placed over the second air vent (112) to allow the escape of air but to prevent the escape of fluid. Using the oleophobic membrane (752) or plug allows for a greater than atmospheric pressure to be maintained within the housing (FIG. 1, 102). In yet another example, both the labyrinth (748), label (750), and the oleophobic membrane (752) may be used as indicated in FIG. 7C.

Using such a device for coalescing a frothy fluid 1) allows for real-time, and not delayed, batched, or periodic, dispersal of froth from a fluid; 2) is passive in that it doesn't rely on sensors, or other moving components to dissipate the froth; 3) actively promotes the dissipation of froth, rather than allowing the froth to dissipate as merely a function of time; 4) improves froth-dissipation efficiency thereby enhancing the operation of a system that processes a fluid prone to froth accumulation; 5) improves the accuracy of certain system sensors, and 6) accommodates faster operations of a fluid-processing system by providing a continuous real-time defrothing of a frothy fluid. However, it is contemplated that the devices disclosed herein may provide useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A device for coalescing a frothy fluid comprising:
a housing;
alignment devices to:
    receive a number of coalescing filters;
    space the number of coalescing filters to form a gap between adjacent coalescing filters; and
    seal the number of coalescing filters against the housing to enclose the gap;
an inlet port to drive incoming frothy fluid through the gap;
an outlet port to drain coalesced fluid; and
an air vent to allow air to escape the gap.

2. The device of claim 1, wherein the fluid is ink.

3. The device of claim 1, wherein the gap is between 0.5 millimeter (mm) and four mm wide.

4. The device of claim 1, wherein the inlet port is to align with a bottom of the number of coalescing filters when disposed within the housing and drives the incoming frothy fluid perpendicular to pores in the filter.

5. The device of claim 1, wherein the air vent maintains a greater than atmospheric pressure within the housing.

6. The device of claim 1, wherein the air vent exposes an interior of the housing to atmospheric pressure.

7. The device of claim 1, further comprising a lid to cap the housing, wherein the lid comprises a second air vent.

8. The device of claim 1, wherein the air vent comprises an oleophobic layer to allow the escape of air while preventing the escape of fluid.

9. The device of claim 1, wherein the air vent comprises a labyrinth to control the water vapor transmission rate (WVTR) to and from the filter chamber.

10. The device of claim 1, wherein the inlet port and outlet port are disposed on a bottom of the housing.

11. A system for coalescing a frothy fluid comprising:
a filter chamber comprising:
    a housing;
    alignment devices to:
        receive a number of coalescing filters;
        space the number of coalescing filters to form a gap between adjacent coalescing filters; and
        seal the number of coalescing filters against the housing to enclose the gap;
    an inlet port to drive incoming frothy fluid through the gap;
    an outlet port to drain coalesced fluid produced as bubbles in the frothy fluid dissipate; and
    a first air vent to allow air to escape the gap; and
multiple coalescing filters to mate with the alignment devices, wherein the coalescing filters are separated from one another by the gap.

12. The system of claim 11, wherein the multiple coalescing filters:
- are removable from the filter chamber, and
- are selected from a set of coalescing filters, the set comprising coalescing filters that are the same or that differ from one another with regards to at least one of a filter area, a filter pore size, a filter material, and a separation from an adjacent coalescing filter.

13. The system of claim 11, wherein the multiple coalescing filters are polymer filters.

14. The system of claim 11, wherein the housing comprises a ridge disposed in the gap along a bottom surface of the housing to direct coalesced fluid through the multiple coalescing filters.

15. The system of claim 14, wherein the ridge is sloped to direct the coalesced fluid to the outlet port.

16. The system of claim 11, wherein the housing comprises an outlet roof to facilitate drainage of frothy fluid that passes through the first air vent in the outlet roof.

17. The system of claim 16, wherein the outlet roof is slanted to drain the coalesced towards the outlet port.

18. The system of claim 11, wherein bottoms of coalescing filter frames are slanted to guide the coalesced fluid to the outlet port.

19. A system for coalescing a frothy fluid comprising:
- a rectangular filter chamber comprising:
  - a housing;
  - alignment devices, wherein each alignment device:
    - comprises a ridge around an interior of the housing; and
    - is to:
      - receive at least two coalescing filters;
      - space the at least two coalescing filters to form a gap between adjacent coalescing filters, wherein the gap is to stack individual froth bubbles on top of one another in single file; and
      - seal the at least two coalescing filters against the housing to enclose the gap, wherein the ridge mates with recesses in a coalescing filter;
  - an inlet port to drive incoming frothy fluid through the gap perpendicular to pores in the at least two coalescing filters;
  - an outlet port to drain coalesced fluid;
  - a first air vent to allow air to escape the gap;
  - a lid having a second air vent to allow air to escape the rectangular filter chamber; and
  - a removable front cover to facilitate insertion of multiple coalescing filters; and
- at least two coalescing filters, a coalescing filter to:
  - mate with an alignment device;
  - dissipate bubbles in the frothy fluid; and
  - allow passage of coalesced fluid through pores in the coalescing filter, wherein the coalescing filters are separated from one another by the gap.

20. The system of claim 19, wherein a portion of an alignment device is disposed on the removable front cover.

* * * * *